(12) United States Patent
Kobzantsev et al.

(10) Patent No.: US 12,199,685 B2
(45) Date of Patent: Jan. 14, 2025

(54) LOW COMPLEXITY ANGLE OF ARRIVAL (AOA) ARRAY CALIBRATION

(71) Applicant: Huawei Technologies Co., Ltd., Shenzhen (CN)

(72) Inventors: Alexander Kobzantsev, Hod Hasharon (IL); Doron Ezri, Hod Hasharon (IL); Avi Weitzman, Hod Hasharon (IL); Chun Pan, Nanjing (CN); Xingfeng Jiang, Nanjing (CN); Jie Fu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 473 days.

(21) Appl. No.: 17/657,645

(22) Filed: Apr. 1, 2022

(65) Prior Publication Data

US 2022/0224424 A1    Jul. 14, 2022

Related U.S. Application Data

(63) Continuation of application No. PCT/EP2019/076940, filed on Oct. 4, 2019.

(51) Int. Cl.
  *H04B 17/12*    (2015.01)
  *H04B 7/0413*   (2017.01)
  *H04B 7/06*     (2006.01)
  *H04B 17/21*    (2015.01)

(52) U.S. Cl.
  CPC ......... *H04B 17/12* (2015.01); *H04B 7/0413* (2013.01); *H04B 7/0617* (2013.01); *H04B 17/21* (2015.01)

(58) Field of Classification Search
  CPC .... H04B 17/12; H04B 7/0413; H04B 7/0617; H04B 17/21
  See application file for complete search history.

(56) References Cited

U.S. PATENT DOCUMENTS

| 11,108,442 B1 * | 8/2021 | Tian ................. H04B 17/12 |
| 2016/0345286 A1 | 11/2016 | Jamieson et al. |
| 2018/0337713 A1 * | 11/2018 | Elsherif ............... H04B 7/0634 |

FOREIGN PATENT DOCUMENTS

| CN | 103916168 A | 7/2014 |
| CN | 105940552 A | 9/2016 |
| CN | 109738854 A | 5/2019 |

(Continued)

OTHER PUBLICATIONS

Fistas, N. et al., "A New General Global Array Calibration Method", IEEE, Apr. 19-22, 1994, 4 Pages.

(Continued)

*Primary Examiner* — Eric Myers
(74) *Attorney, Agent, or Firm* — Slater Matsil, LLP (57) ABSTRACT

A Multiple-Input Multiple-Output (MIMO) device comprises an array of multiple antennas and a circuitry configured to receive, using the array of multiple antennas, a plurality of calibration signals from a plurality of proximate wireless MIMO devices, calibrate the wireless MIMO device based on the received calibration signals and based on known directions from the wireless MIMO device to each of the proximate wireless MIMO devices, and drive the array of multiple antennas to emit a beam-formed calibration signal to each of the proximate wireless devices in order to enable each of the proximate wireless MIMO devices to calibrate itself.

20 Claims, 5 Drawing Sheets

(56) References Cited

FOREIGN PATENT DOCUMENTS

EP 3521842 A1 8/2019
WO 2015114355 A1 8/2015

OTHER PUBLICATIONS

Paulraj, A. et al., "Direction of Arrival Estimation by Eigenstructure Methods with Unknown Sensor Gain and Phase", IEEE, Apr. 26-29, 1985, 4 Pages.

* cited by examiner

LOW COMPLEXITY ANGLE OF ARRIVAL (AOA) ARRAY CALIBRATION

CROSS-REFERENCE TO RELATED APPLICATIONS

This application is a continuation of International Application No. PCT/EP2019/076940, filed on Oct. 4, 2019, the disclosure of which is hereby incorporated by reference in its entirety.

TECHNICAL FIELD

The present invention, in some embodiments thereof, relates to calibrating an Angle of Arrival (AOA) of antenna arrays of wireless multiple-input and multiple-output (MIMO) devices and, more specifically, but not exclusively, to calibrating an AOA of antenna arrays of wireless MIMO devices using calibration signals received from a plurality of proximate wireless MIMO devices.

BACKGROUND

As wireless communication has become a corner stone for voice and data worldwide, there is a demand for constant increase in service capacity and bandwidth over the wireless networks, for example, cellular networks, Wireless Local Area Networks (WLAN) (e.g. Wi-Fi) and/or the likes. The wireless communication protocols are therefore constantly evolving to support the need for improved service, for example, increased throughput, reduced latency and improvements in other parameters of the wireless service.

One of the most prominent and efficient methods to increase wireless throughput and improve service is configuring the wireless network access devices, for example, Access Points (AP), routers, cellular cells (base stations), and/or the like to include antenna arrays comprising multiple transmit (TX) antennas and optionally multiple receive (RX) antennas to support MIMO transmission to one or more wireless devices (users) which may each include one or more RX antennas.

In the MIMO transmission, multiple transmission streams may be simultaneously transmitted to one or more stations. However, in order to reduce and desirably eliminate mutual interference between the simultaneously transmitted streams, the streams may be transmitted in a directional transmission mode (at desired Angle of Departure (AOD)) known in the art as beamforming. The majority of the energy of transmitted beam-formed signals is concentrated in a significantly narrow beam (center lobe) emitted in a certain direction rather than distributed in all direction as may be the case for omnidirectional transmission modes.

Naturally, in order to establish efficient directional (beamforming) transmission, the wireless MIMO devices need to be accurately calibrated in order to have their antenna arrays aligned such that their measured AOA is aligned in space according to known directions and/or coordinates.

Another important use case may be WLAN (e.g. Wi-Fi) based indoor navigation which is based on estimation of the AOA measured by MIMO devices equipped with antenna arrays arranged in specially designed geometry such as, for example, Uniform Linear, Uniform Circular array or another. The antenna array calibration is therefore crucial for high accuracy AOA estimation which may be essential for the MIMO device in order to accurately position itself and other clients in space.

SUMMARY

An objective of the embodiments of the disclosure is to provide a solution which mitigates or solves the drawbacks and problems of conventional solutions.

The above and further objectives are solved by the subject matter of the independent claims. Further advantageous embodiments can be found in the dependent claims.

The disclosure aims at providing a solution for efficiently calibrating wireless MIMO devices, in particular proximate wireless MIMO devices deployed in a wireless environment characterized by multipath effects, for example, an indoor wireless environment, an urban wireless environment and/or the like.

According to a first aspect of the present invention there is provided a wireless multiple-input and multiple-output (MIMO) device, comprising an array of multiple antennas and a circuitry configured to receive, using the array of multiple antennas, a plurality of calibration signals from a plurality of proximate wireless MIMO devices (located at fixed and known locations), calibrate the wireless MIMO device based on the received calibration signals and based on known directions from the wireless MIMO device to each of the proximate wireless MIMO devices, and drive the array of multiple antennas to emit a beam-formed calibration signal to each of the proximate wireless devices in order to enable each of the proximate wireless MIMO devices to calibrate itself.

According to a second aspect of the present invention there is provided a method of operating a wireless multiple-input and multiple-output (MIMO) device. The method comprises: receiving, using an array of multiple antennas of the wireless MIMO device, a plurality of calibration signals from a plurality of proximate wireless MIMO devices, calibrating the wireless MIMO device based on the received calibration signals and based on known directions from the wireless MIMO device to each of a plurality of proximate wireless MIMO devices, and driving the array of multiple antennas to emit a beam-formed calibration signal to each of the proximate wireless devices in order to enable each of the proximate wireless MIMO devices to calibrate itself.

The calibration based on calibration signals received from a plurality of proximate wireless MIMO devices may ensure calibration of the entire transmission path including the RF transmission chains (circuits) of the calibrating wireless device including the antenna circuit(s) since it is based on calibration signals traveling the entire transmission path. In addition, the calibrating wireless MIMO device may be fully operational during the calibration process since its transmission and reception paths are in operational mode. Moreover, calibration may overcome multipath effects, which may be typical to indoor transmission environment, since the calibration signals received from the plurality of proximate wireless MIMO devices may be aggregated to improve measurement of the AOA of the calibration signals.

In a further implementation form of the first and/or second aspects, the wireless MIMO device is operable as an access point (AP) of a wireless network. Applying the calibration to MIMO APs may be highly desirable since the MIMO APs typically serve a plurality of wireless stations located at different directions and the calibrated MIMO AP may thus accurately transmit the plurality of streams to the directions of the stations.

In a further implementation form of the first and/or second aspects, the wireless network is a Wi-Fi network. Applying the calibration to Wi-Fi MIMO APs may be highly desirable since Wi-Fi networks are extremely common and deployed in a plurality of sites.

In a further implementation form of the first and/or second aspects, the calibration of the wireless MIMO device comprises estimating a phase mismatch and/or an amplitude mismatch for each of one or more of the multiple antennas based on the plurality of received calibration signals and based on the known directions from the wireless MIMO device to each of the plurality of proximate wireless devices, and adjusting transmission coefficients according to the phase mismatch and/or the amplitude mismatch. Since the calibration is based on comparing the phase and/or amplitude mismatches measured for the calibration signals compared to the known direction of the proximate wireless MIMO devices, the calibration may be significantly accurate.

In a further implementation form of the first and/or second aspects, each of the plurality of proximate wireless MIMO devices transmits a respective one of the calibration signals in omnidirectional transmission mode. Prior to being calibrated the proximate wireless MIMO devices may transmit the calibration signals in omnidirectional transmission mode since they may not be able to accurately direct (beam-form) the calibration signals in the exact direction of the calibrating wireless MIMO device.

In a further implementation form of the first and/or second aspects, the circuitry is configured to calibrate the wireless MIMO device according to an aggregation of an Angle of Arrival (AOA) of the plurality of calibration signals received from at least some of the plurality of proximate wireless MIMO devices. Aggregating the AOA of the plurality of calibration signals received from the plurality of proximate wireless MIMO devices may significantly reduce the multipath effects resulting from the omnidirectional transmission of these calibration signals.

In a further implementation form of the first and/or second aspects, the circuitry is configured to perform two or more calibration iterations. Each calibration iteration comprising receiving, using the array of multiple antennas, a plurality of calibration signals from a plurality of proximate wireless MIMO devices, calibrating the wireless MIMO device based on the received calibration signals and based on known directions from the wireless MIMO device to each of the proximate wireless MIMO devices, and driving the array of multiple antennas to emit a beam-formed calibration signal to each of the proximate wireless devices in order to enable each of the proximate wireless MIMO devices to calibrate itself. Executing a plurality of calibration iterations may significantly increase calibration accuracy.

In a further implementation form of the first and/or second aspects, one or more of the plurality of proximate wireless MIMO devices is further configured to calibrate itself using—formed calibration signals received from one or more additional wireless MIMO devices of the plurality of proximate wireless MIMO devices after the additional wireless MIMO device(s) is calibrated. Calibrating a wireless MIMO device according to beam-formed calibration signals received from multiple proximate wireless MIMO devices located at different directions with respect to the calibrating wireless MIMO device may significantly enhance convergence of the calibration process and may reduce the number of calibration iterations for one or more of the proximate wireless MIMO devices.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

The circuitry may comprise hardware and software. The hardware may comprise analog circuitry or digital circuitry, or both analog and digital circuitry. Digital circuitry may comprise components such as application-specific integrated circuits (ASICs), field-programmable arrays (FPGAs), digital signal processors (DSPs), or general-purpose processors. In one embodiment, the processing circuitry comprises one or more processors and a non-transitory memory connected to the one or more processors. The non-transitory memory may carry executable program code which, when executed by the one or more processors, causes the wireless MIMO device to perform the operations or methods described herein.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF ILLUSTRATIVE EMBODIMENTS

The present invention, in some embodiments thereof, relates to calibrating an AOA antenna arrays of wireless MIMO devices and, more specifically, but not exclusively, to calibrating an AOA antenna arrays of wireless MIMO devices using calibration signals received from a plurality of proximate wireless MIMO devices.

Wireless MIMO technology is widely spread and extensively deployed to provide improved wireless service, in particular increased throughput, reduced latency and/or the like. One of the fundamental concepts and features of the MIMO transmission is the ability to transmit directional wireless signals known in the art as beamforming. The energy of beam-formed signals is distributed such that most of the energy (main lobe) is concentrated in a specific direction. Applying the directional wireless transmission, a MIMO wireless device comprising an array of multiple transmit antennas may therefore transmit simultaneously multiple transmission streams to one or more stations located at different direction with minimal and potentially no mutual interference between the simultaneously transmitted streams.

However, the performance of the directional transmission may be significantly degraded due to one or more electrical and/or mechanical errors and/or deviations which may affect operation of the MIMO wireless device, in particular, the operation of the RF transmission chains (circuits), i.e., the transmitter and/or receiver of the MIMO wireless device. Such errors and/or deviations may result and/or be induced by one or more sources, for example, electrical, mechanical and/or environmental attributes and/or conditions such as, for example, an antenna displacement, a state of an Automatic Gain Control (AGC) circuit, a temperature of the transmission environment (transmission medium) and/or the like.

According to some embodiments of the present invention there are provided devices, systems and methods for improved and low complexity calibration of the AOA of an antenna array of a calibrating wireless MIMO device comprising multiple transmit (TX) antennas using calibration signals received from a plurality of proximate wireless MIMO devices which are in wireless proximity, i.e., within a wireless coverage range of the calibrating wireless MIMO device. The proximate wireless MIMO devices may include, for example, an Access Point (AP), a wireless router, a wireless station (STA) and/or the like deployed to form a wireless environment employing one or more wireless communication, for example, IEEE 802.11 (e.g. Wi-Fi) and/or the like.

The calibrating wireless MIMO devices may calibrate one or more of its RF transmission chain(s) to support accurate AOA measurement of its antenna array in order to be able to efficiently and accurately drive its transmit antenna array to transmit wireless directional (beam-formed) signals and accurately detect the AOA of wireless signals intercepted by its receive antenna array. To this end, the calibrating wireless MIMO device may adjust one or more transmission coefficients of its transmitter and/or receiver in order to compensate for one or more of the errors and/or deviations affecting the transmission and/or reception of the wireless signals.

The calibrating wireless MIMO device which is in wireless proximity to at least some of the other proximate wireless MIMO devices, i.e., within the wireless coverage range of the other wireless MIMO devices may receive a plurality of calibration signals from at least some other wireless MIMO devices serving as synchronizing devices. The calibrating device may calibrate itself according to the received calibration signals based on a direction (plane angle (azimuth) and altitude angle (elevation)) of a Line of Sight (LOS), i.e., a straight line from each of the synchronizing wireless MIMO devices to the calibrating wireless device. The directions to the synchronizing wireless MIMO devices are known (available) to the calibrating wireless MIMO device.

The calibrating wireless MIMO device may estimate phase and/or amplitude mismatches in the received calibration signals and may calibrate itself accordingly, for example, adjust one or more transmission coefficients in one or more of the RF transmission chains (transmitter and/or receiver) based on the estimated phase and/or amplitude mismatches.

However, as they are not yet calibrated and may thus not be able to accurately apply beamforming, the synchronizing wireless MIMO devices may transmit the calibration signals in omnidirectional transmission mode such that the calibration signals are emitted in all directions. The calibration signals may therefore suffer one or more multipath effects as known in the art, for example, a delay, an inconsistent AOA at the calibrating wireless MIMO device and/or the like resulting from a single transmission stream traveling multiple and/or indirect paths due to reflections and deflections from objects in the wireless environment.

In order to compensate, reduce and potentially eliminate the multipath effect(s), the calibrating wireless MIMO device may first aggregate the plurality of calibration signals received from the plurality of synchronizing wireless MIMO devices. Specifically, the calibrating wireless MIMO device may aggregate the estimated phase and/or amplitude mismatch computed for the plurality of calibration signals received from the plurality of synchronizing wireless MIMO devices to compute (measure) an aggregated AOA. The calibrating wireless MIMO device may then estimate the phase and/or amplitude mismatches in the received calibration signals based on the average of the aggregated phase and/or amplitude mismatch estimation. As the multipath effect(s) are significantly reduced and/or completely removed by averaging of calibration signals AOA, the estimation of the phase and/or amplitude mismatches may be significantly more accurate.

The calibrating wireless MIMO device may then calibrate itself, for example, adjust one or more transmission coefficients in one or more of the RF transmission chains (transmitter and/or receiver) based on the estimated phase and/or amplitude mismatches. The calibration done by the calibrating wireless MIMO devices is thus directed to align the antenna array such that the AOA of signals received from the synchronizing wireless MIMO devices match the known directions of these synchronizing wireless MIMO devices.

After the calibrating wireless MIMO device is calibrated, it may transmit calibration signals to one or more of the other proximate wireless MIMO devices to enable these wireless MIMO devices to calibrate themselves. In particular, the calibrated wireless MIMO device may apply beamforming and may thus accurately transmit wireless signals in a directional transmission mode. The calibrated wireless MIMO device may therefore drive its array of transmit antennas to transmit (emit) one or more beam-formed calibration signals to one or more of the other proximate wireless MIMO devices.

The calibration process may be conducted by each of the proximate wireless MIMO devices in series such that the number of calibrated wireless MIMO devices gradually increases until all the proximate wireless MIMO devices are calibrated. Since the calibration process is based on aggregation of the calibration signals received from a plurality of wireless MIMO devices, it may be most effective that the first wireless MIMO device to execute the calibration process may be the wireless MIMO device having the highest number (most) of proximate wireless MIMO devices, i.e., the wireless MIMO device which is within the wireless coverage range of the highest number proximate wireless MIMO devices.

Optionally, after calibrated, one or more of the proximate wireless MIMO devices may repeat the calibration process and perform one or more additional calibration iterations in order to further improve the calibration of their RF transmission chains. In each of the calibration iterations, the calibrating wireless MIMO device may receive beam-formed calibration signals from one or more of the other proximate wireless MIMO devices. As the directional calibration signals may be significantly immune to the multipath effect(s), the phase and/or amplitude mismatches may be significantly reduced thus significantly improving the calibration accuracy of the RF transmission chains at the calibrating wireless MIMO device. Naturally, the iterative calibration process may be further conducted by one or more of the other proximate wireless MIMO devices to further improve the calibration accuracy of their respective RF transmission chains.

Moreover, since the calibration process is gradual and done in series by the proximate wireless MIMO devices, one or more calibrating wireless MIMO devices of the proximate wireless MIMO devices may calibrate itself using calibration signals, in particular beam-formed calibration signals received from multiple (synchronizing) proximate wireless MIMO devices which are already calibrated and are in the wireless coverage range of the calibrating wireless MIMO device. This may significantly enhance the calibration process by expediting convergence thus reducing the number of calibration iterations required by one or more of the proximate wireless MIMO devices to calibrate themselves. The expedited convergence is due to the fact that since the calibrating wireless MIMO device receives the beam-formed calibration signals from multiple synchronizing wireless MIMO devices having multiple different directions with respect to the calibrating wireless MIMO device, the calibrating wireless MIMO device may estimate with increased accuracy the gain and/or amplitude mismatches in the calibration signals received from multiple (known) reference directions. As the accuracy of the estimated gain and/or amplitude mismatches is rapidly increased, the calibration of the transmission coefficients to align the AOA antenna array may be also rapidly achieved.

The proximate wireless MIMO devices calibration process based on aggregation of the calibration signals may present significant advantages and benefits compared to currently existing methods and systems for calibrating wireless MIMO devices.

Some of the existing calibration methods may be based on direct transmit-receive calibration in which a wireless MIMO device may be calibrated by injecting signals transmitted via the transmitter back (feedback) to the receiver, for example, via a splitter, a switch matrix, a bypass antenna circuit and/or the like. The calibration accuracy of such direct injection methods may be highly limited since only a part of the transmission path is calibrated, specifically the transmission and reception paths internal to the wireless MIMO device while the antenna circuit(s) are not calibrated. Moreover, due to the close physical proximity between the transmitter and receiver circuits, the direct injection methods may suffer from transmit-receive coupling which may degrade the calibration accuracy. Furthermore, during the calibration process the wireless MIMO device is not operational as it may be incapable of communicating (transmit/receive) with other devices.

The proximate wireless MIMO devices calibration on the other hand ensures calibration of the entire transmission path including the antenna circuit(s) since it is based on calibration signals received from other wireless devices. Transmit-receive coupling is also avoided using the proximate wireless MIMO devices calibration since there is no injection of the transmitted signals back into the receiver. In addition, the wireless MIMO device may be fully operational during the calibration process since its transmission and reception paths are in operational mode and not set to some feed-back mode as may be done by the direct injection methods.

Other existing calibration methods may be based on calibrating the wireless MIMO device in an enclosed chamber in which a calibration transmitter placed boresight to the antenna array of the calibrating wireless MIMO device transmits calibration signals to the calibrating wireless MIMO device. While resolving the partial transmission path calibration limitation and the transmit-receive coupling limitation, these calibration methods may be highly expensive and non-scalable as each wireless MIMO device needs to be calibrated individually using the calibration transmitter. Moreover, every change to the hardware of the RF transmission chains (transmitter and/r receiver) and/or to the antenna of the wireless MIMO device may require re-calibrating the wireless MIMO device. Furthermore, such calibration methods which may be done in a certain environment may be limited in adapting the RF transmission chains according to environmental conditions applicable to the actual (real) wireless environment.

Such limitations are easily overcome by the proximate wireless MIMO devices calibration which is done in the field after the wireless MIMO device is deployed and may thus adapt the RF transmission chains of the calibrating wireless MIMO device according to environmental conditions applicable to the real wireless environment. Moreover, since is based on calibration signals received from proximate wireless MIMO devices which are already deployed in the field as part of an operational deployment, the proximate wireless MIMO devices calibration requires no special equipment and/or special setup. As such, the proximate wireless MIMO devices calibration may be highly simple, scalable and/or significantly less costly compared to the other calibration methods.

Yet other existing calibration methods may include calibration of the wireless MIMO device based on calibration signals received from a plurality of proximate wireless devices which direction is known to the calibrating wireless MIMO device. However, such calibration methods may require a clear dominant LOS transmission path in order for the calibrating wireless MIMO device to efficiently compute the gain and/or amplitude mismatches of the received calibration signals compared to the known directions of the proximate wireless devices. These calibration methods are therefore very limited for calibrating wireless MIMO devices on wireless environments characterized by multipath effects, for example, indoor environments, urban environments and/or the like.

In contrast, the proximate wireless MIMO devices calibration may overcome such multipath and/or no LOS transmission path since it is based on aggregating of the calibration signals received from the plurality of proximate wireless MIMO devices which may produce a significantly more accurate aggregated calibration signals measurements thus reducing and potentially eliminating the multipath effect(s).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
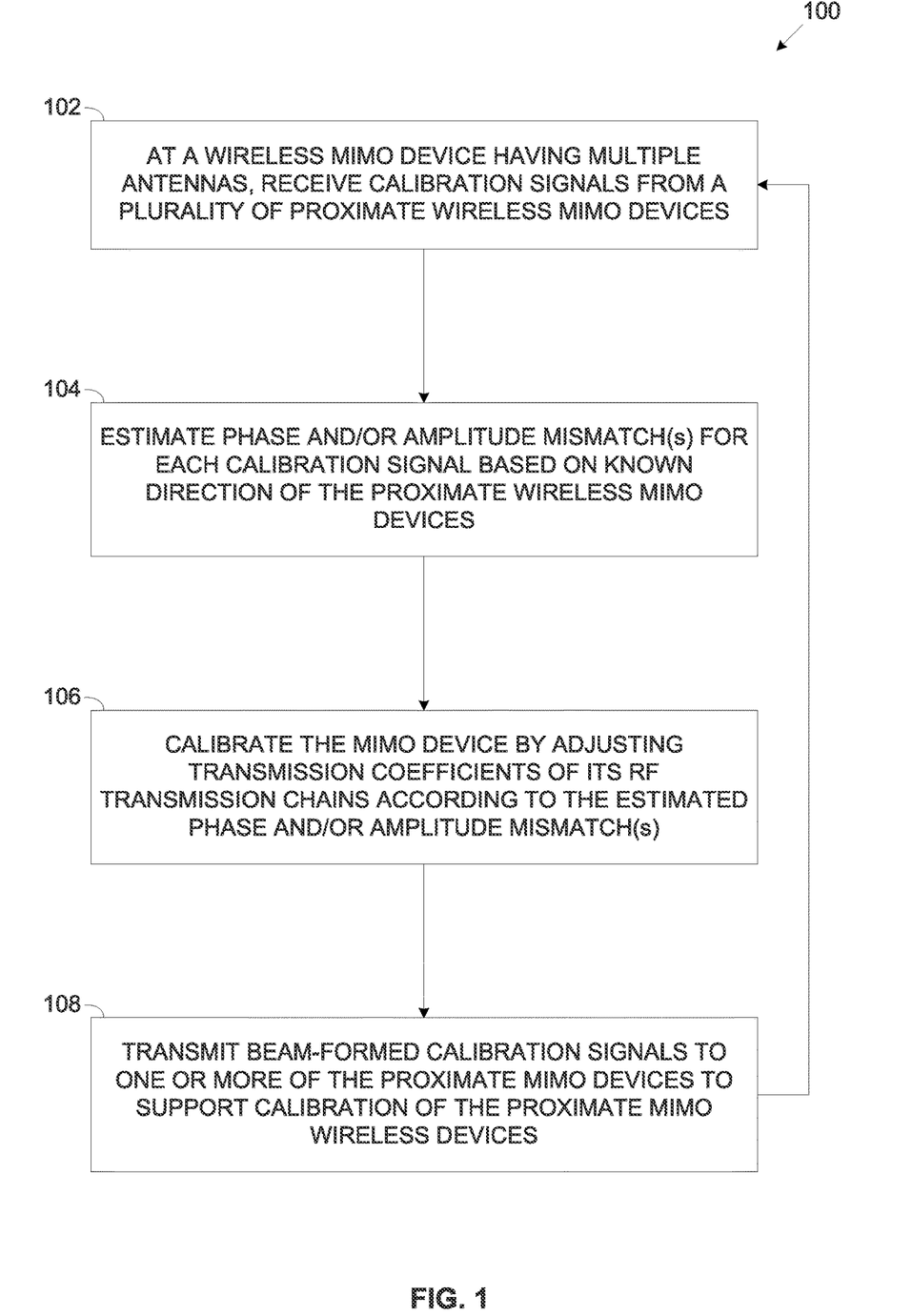
FIG. 1 is a flowchart of an exemplary process of calibrating a plurality of proximate wireless MIMO devices according to calibration signals exchanged between the devices, according to some embodiments of the present invention.

Referring now to the drawings, FIG. 1 is a flowchart of an exemplary process of calibrating a plurality of proximate wireless MIMO devices according to calibration signals exchanged between the devices, according to some embodiments of the present invention. An exemplary process 100 may be executed by one or more of a plurality of proximate wireless MIMO devices each comprising an array of multiple transmit and/or receive antennas for calibrating their RF transmission (transmit and/or receive) chains (circuits) to support accurate AOA measurements for their plurality of antennas.

Figure 2:
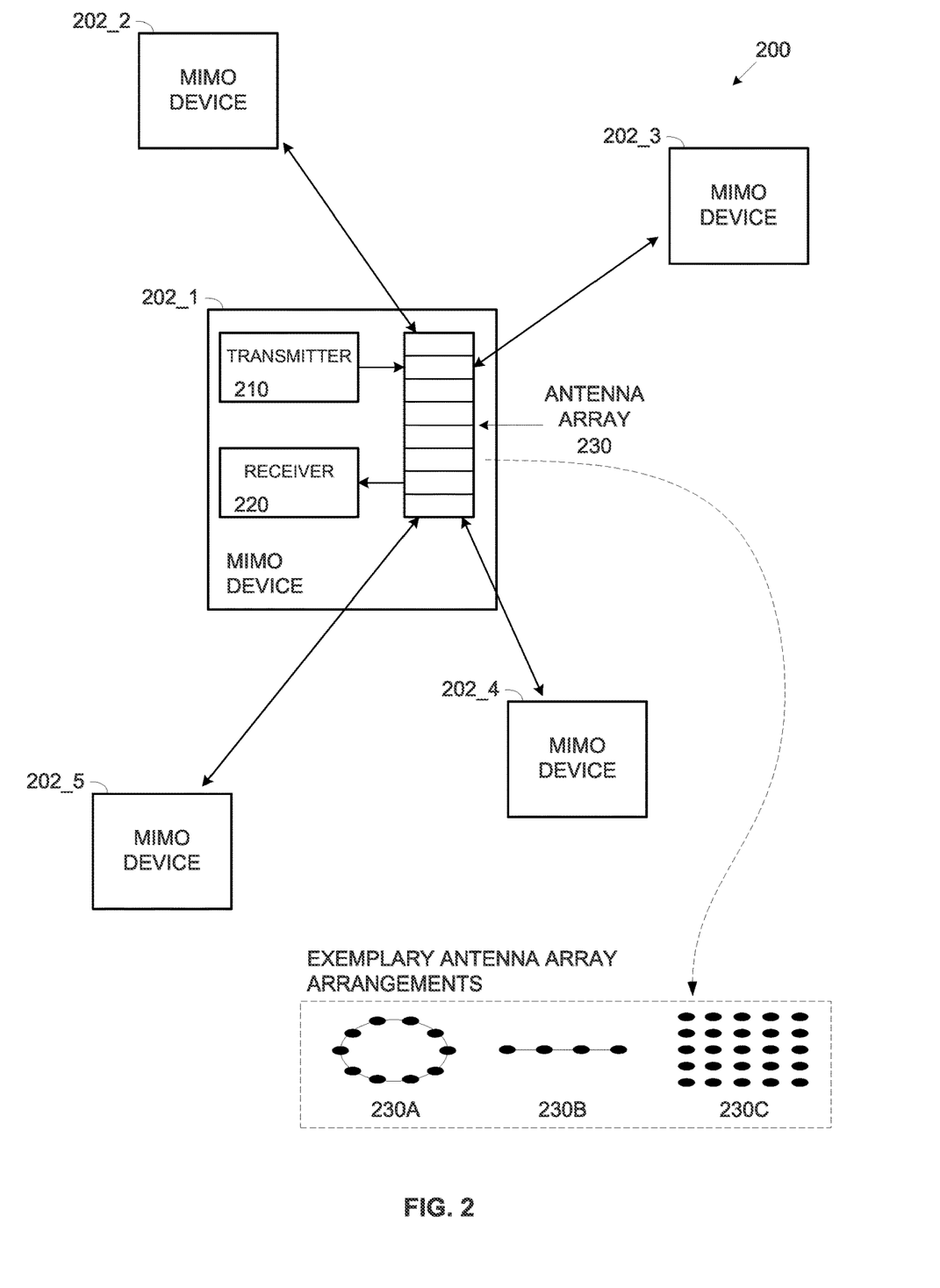
FIG. 2 is a schematic illustration of an exemplary wireless environment comprising a plurality of proximate wireless MIMO devices which calibrate according to calibration signals exchanged between the devices, according to some embodiments of the present invention.

Reference is also made to FIG. 2, which is a schematic illustration of an exemplary wireless environment comprising a plurality of proximate wireless MIMO devices which calibrate according to calibration signals exchanged between the devices, according to some embodiments of the present invention. An exemplary wireless environment 200 may include a plurality of wireless devices 202, for example, a wireless AP, a wireless router, a wireless station and/or the like. In particular, the wireless devices 202, for example wireless devices 202_1, 202_, 202_3, 202_4 and 202_5 are MIMO wireless devices each having an array of multiple transmit and/or receive antennas configured to support beamforming and directional transmission as known in the art.

The wireless environment 200 may be deployed to operate according to one or more wireless network protocols, for example, IEEE 802.11 (e.g. Wi-Fi) and/or the like. Moreover, each of the MIMO wireless devices 202 is in wireless proximity to at least some of the other MIMO wireless devices 202, i.e., within the wireless coverage range of the other wireless MIMO devices.

Each of the MIMO wireless devices 202 includes a transmitter (transmit circuit) 210 configured to support MIMO transmission by driving transmission signals to an antenna array 230 of the MIMO wireless devices 202 comprising a plurality of transmit (TX) antennas. Each of the MIMO wireless devices 202 also includes a receiver (receive circuit) 212 configured to receive from the antenna array 230 wireless signals intercepted by the antenna array 230 comprising one or more receive (RX) antennas.

The antenna array 230 may employ one or more antenna arrangements of the multiple antenna elements as known in the art, for example, uniform circular arrangement 230A, uniform linear arrangement 230B, uniform rectangular arrangement 230C and/or the like.

Each of the MIMO wireless devices 202 may be familiar with the direction, i.e., the angle and elevation of the LOS (i.e., straight line) from each of at least some of the other MIMO wireless devices 202. This means that the direction of the LOS from each of the at least some other MIMO wireless devices 202 to the respective MIMO wireless device 202 is known to the respective MIMO wireless device 202.

The direction information may be provided and made available to the MIMO wireless devices 202 using one or more distribution techniques. For example, the direction information relating to one or more of the proximate MIMO wireless devices 202 with respect to a certain MIMO wireless device 202 may be manually loaded into the certain MIMO wireless device 202 and associated a unique identifier (ID) of the proximate MIMO wireless device(s) 202. In another example, the direction information relating to one or more of the proximate MIMO wireless devices 202 with respect to the certain MIMO wireless device 202 may be transmitted to the certain MIMO wireless device 202 in association with the ID of the respective proximate MIMO wireless device(s) 202. For example, a location of one or more of the proximate MIMO wireless devices 202 may be published (transmitted) to the other proximate MIMO wireless devices 202. Familiar with its own location, a certain one of the proximate MIMO wireless devices 202 may compute the direction of one or more of the other proximate MIMO wireless devices 202 according to the published location of the proximate other MIMO wireless device(s) 202.

The process 100 may eventually be executed by all of the wireless MIMO devices 202 in the wireless environment 200 such that each of the wireless MIMO devices 202 calibrates itself to support accurate AOA and thus accurate directional transmission of signals to desired directions. However, since initially all of the wireless MIMO devices 202 may be uncalibrated, in order to support efficient convergence of the calibration processes, the wireless MIMO devices 202 may execute the process 100 in series.

Since the calibration process is based on aggregation of calibration signals received from a plurality of wireless MIMO devices 202, it may be most effective that the wireless MIMO device 202 to execute the process 100 first may be the wireless MIMO device 202 having the highest number (most) of proximate wireless MIMO devices 202, i.e., the wireless MIMO device 202 which is within the wireless coverage range of the highest number proximate wireless MIMO devices 202. For example, in the wireless environment 200, the wireless MIMO device 202_1 may have the most proximate wireless MIMO devices 202, for example, the wireless MIMO devices 202_2, 202_3, 202_4 and 202_5.

As shown at 102, the process boo starts with the calibrating wireless MIMO device 202, for example, the wireless MIMO device 202_1 receiving a plurality of calibration signals from a plurality of proximate wireless MIMO devices 202, for example, the wireless MIMO devices 202_2, 202_3, 202_4 and 202_5 serving as synchronizing wireless MIMO devices 202. The synchronizing wireless MIMO devices 202_2, 202_3, 202_4 and 202_5 may transmit the calibration signals according to one or more wireless transmission and/or calibration protocols as known in the art.

In particular, as the plurality of wireless MIMO devices 202 are not calibrated, the synchronizing wireless MIMO devices 202_2, 202_3, 202_4 and 202_5 may be unable to apply beamforming for directional transmission of the calibration signals and may thus transmit the calibration signals in omnidirectional transmission mode such that the calibration signals are emitted in all directions.

As shown at 104, the calibrating wireless MIMO device 202_1 may estimate phase and/or amplitude mismatches for each of the calibration signals based on directions of the synchronizing wireless MIMO devices 202_2, 202_3, 202_4 and 202_5 which are known to the calibrating wireless MIMO device 202_1.

Figure 3:
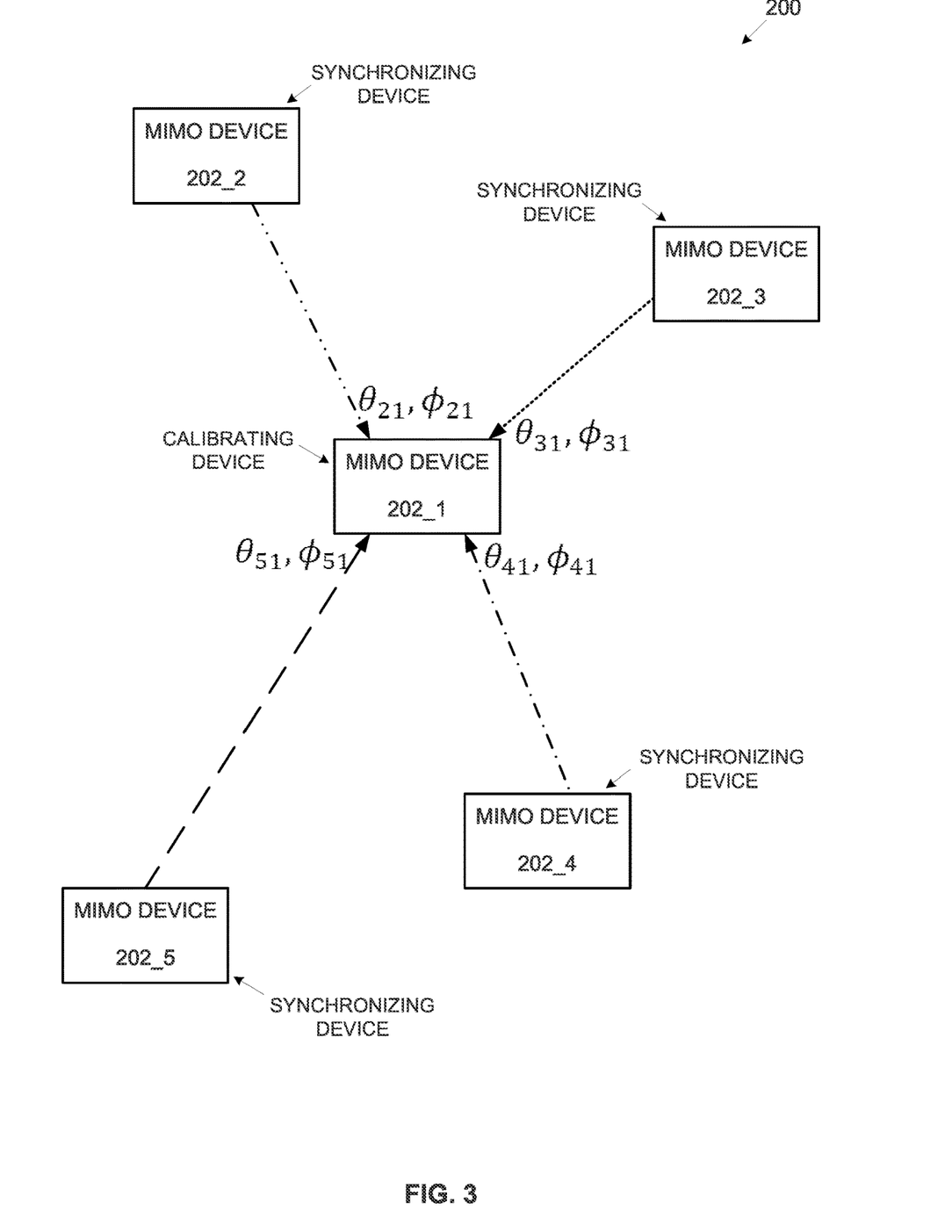
FIG. 3 is a schematic illustration of an exemplary wireless environment in which a wireless MIMO device calibrates according to calibration signals received from a plurality of proximate wireless MIMO devices, according to some embodiments of the present invention.

Reference is now made to FIG. 3, which is a schematic illustration of an exemplary wireless environment in which a wireless MIMO device calibrates according to calibration signals received from a plurality of proximate wireless MIMO devices, according to some embodiments of the present invention. A wireless MIMO device such as the calibrating wireless MIMO device 202_1 deployed in exemplary wireless environment such as the wireless environment 200 may calibrate itself according to calibration signals received from a plurality of proximate wireless MIMO devices such as the synchronizing wireless MIMO devices 202_2, 202_3, 202_4 and 202_5.

As seen, the calibrating wireless MIMO device 202_1 may receive a plurality of calibration signals from the synchronizing wireless MIMO devices 202_2, 202_3, 202_4 and 202_5. Moreover, a three dimensional (3D) direction (plane and altitude) expressed by angles θ and φ (azimuth and elevation) of each of the synchronizing wireless MIMO devices 202_2, 202_3, 202_4 and 202_5 with respect to the calibrating wireless MIMO device 202_1 is known to the calibrating wireless MIMO device 202_1.

For example, the calibrating wireless MIMO device 202_1 may receive one or more calibration signals from the synchronizing wireless MIMO device 202_2 which direction expressed by angle set $\theta_{21}$, $\phi_{21}$ is known to the calibrating wireless MIMO device 202_1. In another example, the calibrating wireless MIMO device 202_1 may receive one or more calibration signals from the synchronizing wireless MIMO device 202_3 which direction, expressed by angle set $\theta_{31}$, $\phi_{31}$, is known to the calibrating wireless MIMO device 202_1. In another example, the calibrating wireless MIMO device 202_1 may receive one or more calibration signals from the synchronizing wireless MIMO device 202_4 which direction, expressed by angle set $\theta_{41}$, $\phi_{41}$, is known to the calibrating wireless MIMO device 202_1. In another example, the calibrating wireless MIMO device 202_1 may receive one or more calibration signals from the synchronizing wireless MIMO device 202_5 which direction, expressed by angle set $\theta_{51}$, $\phi_{51}$, is known to the calibrating wireless MIMO device 202_1.

The calibrating wireless MIMO device 202_1 may apply one or more techniques as known in the art to estimate the phase and/or amplitude mismatches for each of the calibration signals received from the synchronizing wireless MIMO devices 202_2, 202_3, 202_4 and 202_5.

Since the uncalibrated synchronizing wireless MIMO devices 202_2, 202_3, 202_4 and 202_5 transmit the calibration signals in omnidirectional transmission mode, the calibration signals may suffer one or more multipath effects, which will result at inconsistent AOA at the calibrating wireless MIMO device 202_1 and/or the like due to reflections and deflections from objects in the wireless environment 200. These multipath effects may be significantly emphasized in case the wireless environments 200 is deployed in an urban area, indoor location and/or the like comprising a plurality of objects, for example, structures, walls, furniture and/or the like.

The calibrating wireless MIMO device 202_1 may therefore aggregate, for example, average at least some of the plurality of calibration signals received from the synchronizing wireless MIMO devices 202_2, 202_3, 202_4 and 202_5 to compensate, reduce and potentially eliminate the multipath effect(s). Optionally, the aggregated calibration signals includes a calibration signal traveling along the LOS between one or more of the synchronizing wireless MIMO devices 202 and the calibrating wireless MIMO device 202_1 in case the respective LOS is clear. Optionally, the calibrating wireless MIMO device 202_1 may aggregate the plurality of calibration signals received simultaneously from the synchronizing wireless MIMO devices 202_2, 202_3, 202_4 and 202_5.

The calibrating wireless MIMO device 202_1 may apply one or more aggregation methods for aggregating the calibration signals calibration signals received from the synchronizing wireless MIMO devices 202_2, 202_3, 202_4 and 202_5.

For example, the calibrating wireless MIMO device 202_1 may compute the phase and/or amplitude mismatch separately for each of the received calibrating signals received from the plurality of synchronizing wireless MIMO devices 202_2, 202_3, 202_4 and/or 202_5. The calibrating wireless MIMO device 202_1 may then aggregate the separately computed phases and/or amplitudes, for example, by averaging them to produce a vector of calibration coefficients. Averaging of the separately computed phases and/or amplitudes may significantly reduce or potentially eliminate the multipath effect(s).

In another example, the calibrating wireless MIMO device 202_1 may aggregate the calibration signals which are received from the synchronizing wireless MIMO devices 202 during a predefined short period of time. The calibrating wireless MIMO device 202_1 may then apply a global calibration algorithm which takes as input all aggregated calibration signals and calculates a single vector of mismatch phases and/or amplitudes. This approach may directly process raw data obtained from the calibration signals received from all synchronizing wireless MIMO devices 202 and may therefore improve the calibration accuracy. However, since a large number of calibration signals may be received during the predefined time period, aggregating the plurality of calibration signals may require significantly large storage (memory) resources for signals buffering, and may require increased computation resources.

Table 1 below presents the standard deviation of the calibrated mismatch phase accuracy $\sigma_\phi$ while using calibration signals received by a calibrating wireless MIMO device 202 (such as the calibrating wireless MIMO device 202_1) from three synchronizing wireless MIMO devices 202, such as for example, three of the synchronizing wireless MIMO devices 202_2, 202_3, 202_4 and 202_5 all deployed in an exemplary wireless environment such as the wireless environment 200. The calibrating wireless MIMO device 202_1 may calculate the calibrated mismatch phase using one or more methods for estimation of calibration coefficients as described herein after.

In particular, the wireless environment 200 is an indoor wireless environment in which the LOS calibration signal(s) is corrupted by multipath while propagating from the synchronizing wireless MIMO devices 202 to the calibrating wireless MIMO device 202_1.

TABLE 1

| | $\sigma_\phi[°]$ | | |
|---|---|---|---|
| | Single Synchronizing wireless MIMO devices 202 | Two Synchronizing wireless MIMO devices 202 | Three Synchronizing wireless MIMO devices 202 |
| 1 path | 0.1° | 0.08° | 0.06° |
| 3 paths | 7.5° | 4.1° | 2.9° |

TABLE 1-continued

| | $\sigma_\phi[°]$ | | |
| --- | --- | --- | --- |
| | Single Synchronizing wireless MIMO devices 202 | Two Synchronizing wireless MIMO devices 202 | Three Synchronizing wireless MIMO devices 202 |
| 5 paths | 7.8° | 5.4° | 4.6° |
| 18 paths | 10.5° | 7.2° | 6.0° |

As seen in table 1, a single path (i path) which may express a strict directional transmission, i.e., a bean-formed calibration signal received at the calibrating wireless MIMO device 202_1 presents an extremely low standard deviation in the estimated mismatch phase of the calibration signals received at the calibrating wireless MIMO device 202_1. This result is expected since single path calibration signals typically follow the LOS between the synchronizing wireless MIMO device 202 and the calibrating wireless MIMO device 202_1 thus presenting high accuracy for calibration. While significantly accurate even for a single synchronizing wireless MIMO device 202 ($\sigma_\phi$=0.1°), the calibrating wireless MIMO device 202_1 may further reduce the standard deviation in the phase mismatch estimation by averaging the calibration signals received from two or three of the synchronizing wireless MIMO devices 202 to 0.08° and 0.06° respectively.

However, as seen for multipath scenarios, for example, 3 paths, the standard deviation of the estimated mismatch phase using the calibration signals received at the calibrating wireless MIMO device 202_1 is significantly increased due to the multipath effect(s). As seen in table 1, the standard deviation of the estimated mismatch phase computed using calibration signals transmitted by a single synchronizing wireless MIMO device 202 and traveling in 3 transmission paths (LOS path and two reflection/deflection paths) is 7.5°. However, as seen, the standard deviation in the AOA of calibration signals may be significantly reduced by averaging over multiple synchronizing wireless MIMO devices 202. For example, the standard deviation of estimated mismatch phase may be reduced to 4.1° by averaging the calibration signals received from two synchronizing wireless MIMO devices 202 and to 2.9° by averaging the calibration signals received from three synchronizing wireless MIMO devices 202.

The standard deviation of estimated mismatch phase at the calibrating wireless MIMO device 202_1 for a 5 paths scenario is even higher and may reach 7.8° for a single synchronizing wireless MIMO device 202 in the exemplary indoor wireless environment 200. Again, as seen in table 1, the standard deviation in the AOA of calibration signals may be significantly reduced by averaging over calibration signals received from multiple synchronizing wireless MIMO devices 202. The standard deviation of estimated mismatch phase may be reduced to 5.4° by averaging over calibration signals received from two synchronizing wireless MIMO devices 202 and to 4.6° by averaging the calibration signals received from three synchronizing wireless MIMO devices 202.

After aggregating the calibration signals received from the plurality of synchronizing wireless MIMO devices 202, for example, the wireless MIMO devices 202_2, 202_3, 202_4 and 202_5, the calibrating wireless MIMO device 202_1 may compute an estimated mismatch in the phase and/or the amplitude of the calibration signals using the known directions to the synchronizing wireless MIMO devices 202 expressed by the angle sets ($\theta_{21}$, $\phi_{21}$), ($\theta_{31}$, $\phi_{31}$), ($\theta_{41}$, $\phi_{41}$), and ($\theta_{51}$, $\phi_{51}$).

Specifically, based on the aggregated estimated phase mismatch and/or the estimated amplitude mismatch using the calibration signals received from the plurality of synchronizing wireless MIMO devices 202, the calibrating wireless MIMO device 202_1 may estimate the phase and/or the amplitude mismatches significantly more accurately compared to computing the estimated phase and/or amplitude mismatches based on the AOA of calibration signals received from a single synchronizing wireless MIMO device 202.

As shown at 106, the calibrating wireless MIMO device 202_1 may calibrate itself by adjusting one or more transmission coefficients in the transmitter 210 and/or the receiver 212 according to the estimated phase and/or amplitude mismatches and based on the known directions (LOS) of the synchronizing wireless MIMO devices 202. The adjustment to the transmission coefficients may include, for example, adjusting one or more complex gain coefficients in the transmitter 210 and/or the receiver 212 and/or the like.

In particular, the calibrating wireless MIMO device 202_1 may adjust the transmission coefficients such that the RF transmission chains in the transmitter 210 and/or the receiver 212 best fit a steering vector of the of the antenna array 230 according to the known directions of the synchronizing wireless MIMO device 202, specifically the synchronizing wireless MIMO devices 202_2, 202_3, 202_4 and 202_5. In other words, the calibrating wireless MIMO device 202_1 may calibrate its RF transmission chains based on the estimated phase and/or amplitude mismatches to align the antenna array 230 such that the AOA of signals received from the synchronizing wireless MIMO devices 202 match the known directions of the synchronizing wireless MIMO devices 202.

After calibrated, the calibrating wireless MIMO device 202_1 may be able to apply beam forming for accurate transmitting wireless signal in a directional transmission mode as known in the art in which most energy of the transmitted wireless signal is concentered in specific direction.

As shown at 108, the now calibrated wireless MIMO devices 202_1 may serve as a synchronizing wireless MIMO devices 202 and may transmit one or more calibration signals to one or more of the other proximate wireless MIMO devices 202, for example, the wireless MIMO devices 202_2, 202_3, 202_4 and/or 202_5 to enable (support) the other wireless MIMO devices 202 to calibrate themselves. Each of the other proximate wireless MIMO device(s) 202, for example, the wireless MIMO devices 202_2, 202_3, 202_4 and/or 202_5 may execute the process wo to calibrate itself.

Moreover, since it is calibrated and thus capable of transmitting beam-formed signals, the wireless MIMO device 202_1 may transmit beam-formed calibration signals to one or more of the other proximate wireless MIMO devices 202. Transmitting the beam-formed calibration signals may naturally reduce and potentially completely prevent multipath effects since the wireless MIMO device 202_1 may accurately drive its antenna array 230 to transmit the beam-formed calibration signals in the direction of the other proximate wireless MIMO device(s) 202.

Figure 4:
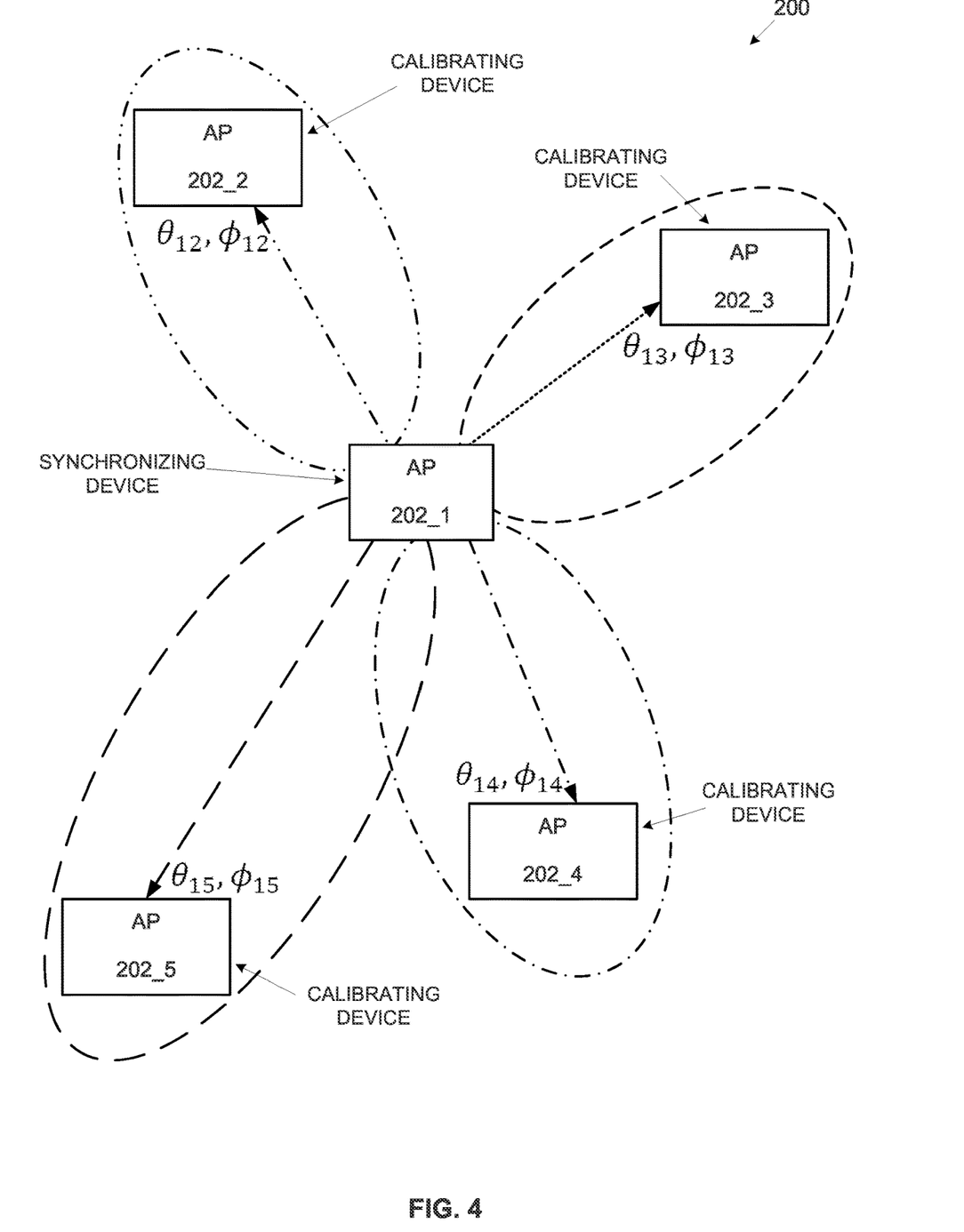
FIG. 4 is a schematic illustration of an exemplary wireless environment in which one or more wireless MIMO devices calibrate according to beam-formed calibration signals received from a proximate calibrated wireless MIMO device, according to some embodiments of the present invention.

Reference is now made to FIG. 4, which is a schematic illustration of an exemplary wireless environment in which one or more wireless MIMO devices calibrate according to beam-formed calibration signals received from a proximate calibrated wireless MIMO device, according to some embodiments of the present invention. A wireless MIMO device such as the calibrated wireless MIMO device 202_1 deployed in exemplary wireless environment such as the wireless environment 200 may transmit beam-formed calibration signals to one or more proximate wireless MIMO devices such as the wireless MIMO devices 202, for example, 202_2, 202_3, 202_4 and/or 202_5 to enable the synchronizing wireless MIMO devices 202 to calibrate themselves.

The calibrated wireless MIMO device 202_1 may transmit the beam-formed calibration signals according to the known 3D direction (expressed by the azimuth and elevation angles $\theta$ and $\phi$) of each of the proximate wireless MIMO devices 202_2, 202_3, 202_4 and/or 202_5 with respect to the calibrated wireless MIMO device 202_1.

For example, the calibrated wireless MIMO device 202_1 may transmit one or more calibration signals to the proximate wireless MIMO device 202_2 which direction, expressed by angle set, $\theta_{12}$, $\phi_{12}$, is known to the calibrating wireless MIMO device 202_1. In another example, the calibrated wireless MIMO device 202_1 may transmit one or more calibration signals to the proximate wireless MIMO device 202_3 which direction, expressed by angle set $\theta_{13}$, $\phi_{13}$, is known to the calibrating wireless MIMO device 202_1. In another example, the calibrated wireless MIMO device 202_1 may transmit one or more calibration signals to the proximate wireless MIMO device 202_4 which direction, expressed by angle set $\theta_{14}$, $\phi_{14}$, is known to the calibrating wireless MIMO device 202_1. In another example, the calibrated wireless MIMO device 202_1 may transmit one or more calibration signals to the proximate wireless MIMO device 202_5 which direction, expressed by angle set $\theta_{15}$, $\phi_{15}$, is known to the calibrating wireless MIMO device 202_1.

According to some embodiments of the present invention, one or more of the proximate wireless MIMO devices 202 for example, the wireless MIMO device 202_1 may execute a plurality of calibration iterations in order to fine tune the calibration of the wireless MIMO device 202_1 by further adjusting the transmission coefficients of the RF transmission chains in the transmitter 210 and/or the receiver 212. In each of the calibration iterations, the wireless MIMO device 202_1 may repeat execution of the process 100 to fine tune itself and further transmit beam-formed calibration signals to enable one or more of the other proximate wireless MIMO devices 202, for example, the proximate wireless MIMO devices 202_2, 202_3, 202_4 and 202_5 to fine tune their own calibration.

In particular, since they are at least partially calibrated, the proximate wireless MIMO devices 202_1, 202_2, 202_3, 202_4 and 202_5 may drive their respective antenna arrays 230 to transit beam-formed calibration signals in directional transmission mode thus reducing and potentially preventing the multipath effects. As they are transmitted in directional transmission mode, the AOA of these beam-formed calibration signals at the calibrating wireless MIMO device 202_1 may significantly match the known directions of the synchronizing wireless MIMO devices 202_2, 202_3, 202_4 and 202_5. The phase and/or amplitude mismatches errors identified by the calibrating wireless MIMO device 202_1 may be therefore significantly small allowing for fine tuning the adjustment of the transmission coefficients of the RF transmission chains at the calibrating wireless MIMO device 202_1.

Moreover, since the calibration process is gradual and done in series by the proximate wireless MIMO devices 202, one or more of the proximate wireless MIMO devices 202 may calibrate itself by executing the process 100 using calibration signals, in particular beam-formed calibration signals received from multiple (synchronizing) proximate wireless MIMO devices 202 which already calibrated. Obviously such calibration process may be executed by one or more of the proximate wireless MIMO devices 202 which are in wireless proximity, i.e., in the wireless coverage range of multiple other wireless MIMO devices 202.

Calibrating using calibration signals received from multiple synchronizing proximate wireless MIMO devices 202 may significantly enhance the calibration process by expediting convergence thus reducing the number of calibration iterations required by one or more of the proximate wireless MIMO devices 202 to calibrate themselves. The expedited convergence is due to the fact that since the calibrating wireless MIMO device 202 receives the beam-formed calibration signals from multiple synchronizing wireless MIMO devices 202 having multiple different directions with respect to the calibrating wireless MIMO device 202, the calibrating wireless MIMO device 202 may estimate with increased accuracy the phase and/or amplitude mismatches in the calibration signals received from multiple (known) reference directions.

Figure 5:
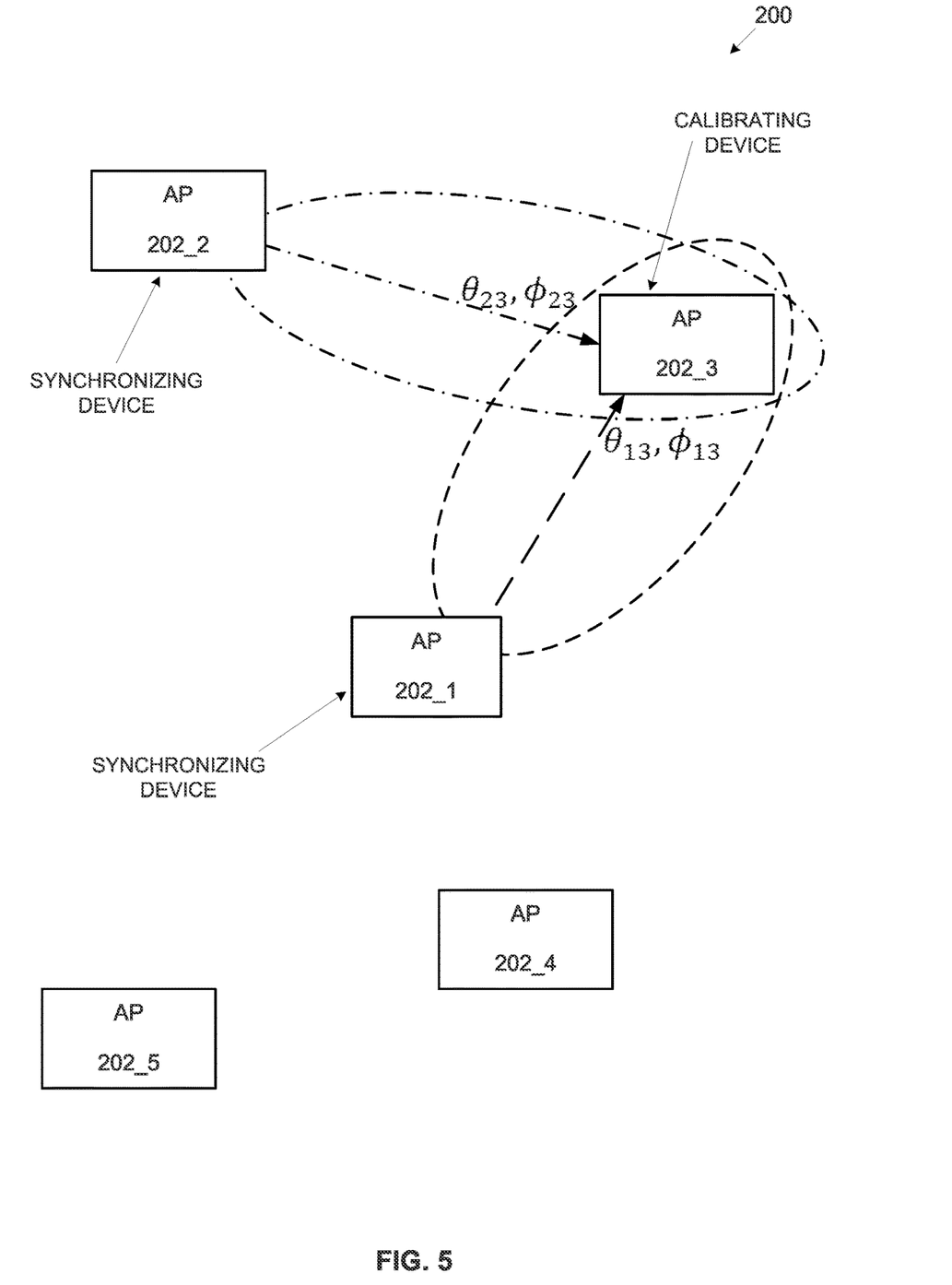
FIG. 5 is a schematic illustration of an exemplary wireless environment in which one or more wireless MIMO devices calibrate according to beam-formed calibration signals received from a plurality of proximate calibrated wireless MIMO devices, according to some embodiments of the present invention.

Reference is now made to FIG. 5, which is a schematic illustration of an exemplary wireless environment in which one or more wireless MIMO devices calibrate according to beam-formed calibration signals received from a plurality of proximate calibrated wireless MIMO devices, according to some embodiments of the present invention. A calibrating wireless MIMO device 202, for example, the wireless MIMO devices 202_3 may receive beam-formed calibration signals from multiple proximate wireless MIMO devices 202, for example, wireless MIMO devices 202_1 and 202_2 serving as synchronizing wireless MIMO devices 202 after calibrated.

The calibrating wireless MIMO device 202_3 may receive one or more beam-formed calibration signals from the synchronizing wireless MIMO device 202_1 (after calibrated) which direction, expressed by angle set $\theta_{13}$, $\phi_{13}$, is known to the calibrating wireless MIMO device 202_3. The calibrating wireless MIMO device 202_3 may further receive one or more beam-formed calibration signals from the synchronizing wireless MIMO device 202_2 (after calibrated) which direction, expressed by angle set $\theta_{23}$, $\phi_{23}$, is known to the calibrating wireless MIMO device 202_3.

Using the beam-formed calibration signals received from the synchronizing wireless MIMO devices 202_1 and 202_2, the calibrating wireless MIMO device 202_3 may rapidly calibrate itself and adjust the transmission coefficients of its transmitter 210 and/or receiver 212 (RF transmission chains) to align its antenna arrays 230.

It is expected that during the life of a patent maturing from this application many relevant systems, methods and computer programs will be developed and the scope of the terms beamforming and calibration protocols are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A wireless multiple-input and multiple-output (MIMO) device, comprising:
    an array of antennas; and
    circuitry, configured to:
        receive, using the array of antennas, a plurality of calibration signals from a plurality of proximate wireless MIMO devices;
        calibrate the wireless MIMO device based on the received plurality of calibration signals and based on known directions from the wireless MIMO device to each proximate wireless MIMO device of the plurality of proximate wireless MIMO devices; and
        drive the array of antennas to emit a beam-formed calibration signal to each proximate wireless MIMO device of the plurality of proximate wireless devices, in order to enable each proximate wireless MIMO device of the plurality of proximate wireless MIMO devices to calibrate itself.

2. The wireless MIMO device of claim 1, wherein the wireless MIMO device is operable as an access point (AP) of a wireless network.

3. The wireless MIMO device of claim 2, wherein the wireless network is a Wi-Fi network.

4. The wireless MIMO device of claim 1, wherein calibrating the wireless MIMO device comprises:
    estimating at least one of a phase mismatch or an amplitude mismatch for each antenna of one or more antennas of the array of antennas based on the received plurality of calibration signals and based on the known directions from the wireless MIMO device to each proximate wireless MIMO device of the plurality of proximate wireless devices, and
    adjusting transmission coefficients according to the at least one of the phase mismatch or the amplitude mismatch.

5. The wireless MIMO device of claim 1, wherein each proximate wireless MIMO device of the plurality of proximate wireless MIMO devices transmits a respective calibration signal of the plurality of calibration signals in omnidirectional transmission mode.

6. The wireless MIMO device of claim 1, wherein the circuitry is configured to calibrate the wireless MIMO device according to an aggregation of calibration signals of the plurality of calibration signals received from at least some proximate wireless MIMO devices of the plurality of proximate wireless MIMO devices.

7. The wireless MIMO device of claim 1, wherein the circuitry is configured to perform two or more calibration iterations, each calibration iteration comprising:
    receiving, using the array of antennas, the plurality of calibration signals from the plurality of proximate wireless MIMO devices,
    calibrating the wireless MIMO device based on the received plurality of calibration signals and based on the known directions from the wireless MIMO device to each proximate wireless MIMO device of the plurality of proximate wireless MIMO devices, and driving the array of antennas to emit a beam-formed calibration signal to each proximate wireless MIMO device of the plurality of proximate wireless devices, in order to enable each proximate wireless MIMO device of the plurality of proximate wireless MIMO devices to calibrate itself.

8. The wireless MIMO device of claim 1, wherein at least one proximate wireless MIMO device of the plurality of proximate wireless MIMO devices is further configured to calibrate itself using beam-formed calibration signals received from at least one additional wireless MIMO device of the plurality of proximate wireless MIMO devices after the at least one additional wireless MIMO device is calibrated.

9. A method, comprising:
receiving, using an array of antennas of a wireless multiple-input and multiple-output (MIMO) device, a plurality of calibration signals from a plurality of proximate wireless MIMO devices,
calibrating the wireless MIMO device based on the received plurality of calibration signals and based on known directions from the wireless MIMO device to each proximate wireless MIMO device of the plurality of proximate wireless MIMO devices, and
driving the array of antennas to emit a beam-formed calibration signal to each proximate wireless MIMO device of the plurality of proximate wireless devices, in order to enable each proximate wireless MIMO device of the plurality of proximate wireless MIMO devices to calibrate itself.

10. The method of claim 9, wherein calibrating the wireless MIMO device comprises:
estimating at least one of a phase mismatch or an amplitude mismatch for each antenna of one or more antennas of the antenna array based on the received plurality of calibration signals and based on the known directions from the wireless MIMO device to each proximate wireless MIMO device of the plurality of proximate wireless devices, and
adjusting transmission coefficients according to the at least one of the phase mismatch or the amplitude mismatch.

11. The method of claim 9, wherein two or more calibration iterations are performed, each calibration iteration comprising:
receiving, using the array of antennas, the plurality of calibration signals from the plurality of proximate wireless MIMO devices and calibrating the wireless MIMO device based on the received plurality of calibration signals and based on known directions from the wireless MIMO device to each proximate wireless MIMO device of the proximate wireless MIMO devices, and
driving the array of antennas to emit a beam-formed calibration signal to each proximate wireless MIMO device of the plurality of proximate wireless devices in order to enable each proximate wireless MIMO device of the plurality of proximate wireless MIMO devices to calibrate itself.

12. The method of claim 9, wherein the wireless MIMO device is operable as an access point of a wireless network.

13. The method claim 12, wherein the wireless network is a Wi-Fi network.

14. The method of claim 9, wherein calibrating the wireless MIMO device comprises:
estimating a phase mismatch for each antenna of one or more antennas of the antenna array based on the received plurality of calibration signals and based on the known directions from the wireless MIMO device to each proximate wireless MIMO device of the plurality of proximate wireless devices, and
adjusting transmission coefficients according to the phase mismatch of each antenna.

15. The method of claim 9, wherein calibrating the wireless MIMO device comprises:
estimating an amplitude mismatch for each antenna of one or more antennas of the antenna array based on the received plurality of calibration signals and based on the known directions from the wireless MIMO device to each proximate wireless MIMO device of the plurality of proximate wireless devices, and
adjusting transmission coefficients according to the amplitude mismatch of each antenna.

16. The method of claim 9, wherein calibrating the wireless MIMO device comprises:
estimating a phase mismatch and an amplitude mismatch for each antenna of one or more antennas of the antenna array based on the received plurality of calibration signals and based on the known directions from the wireless MIMO device to each proximate wireless MIMO device of the plurality of proximate wireless devices, and
adjusting transmission coefficients according to the phase mismatch and the amplitude mismatch of each antenna.

17. The method of claim 9, wherein each proximate wireless MIMO device of the plurality of proximate wireless MIMO devices transmits a respective calibration signal of the plurality of calibration signals in omnidirectional transmission mode.

18. A system, comprising:
a wireless multiple-input and multiple-output (MIMO) device comprising an array of antennas; and
a plurality of proximate wireless MIMO devices;
wherein the wireless MIMO device is configured to:
receive, using the array of antennas, a plurality of calibration signals from the plurality of proximate wireless MIMO devices;
calibrate the wireless MIMO device based on the received plurality of calibration signals and based on known directions from the wireless MIMO device to each proximate wireless MIMO device of the plurality of proximate wireless MIMO devices; and
drive the array of antennas to emit a beam-formed calibration signal to each proximate wireless MIMO device of the plurality of proximate wireless devices; and
wherein each proximate wireless MIMO device of the plurality of proximate wireless MIMO devices is configured to use the corresponding beam-formed calibration signal to calibrate itself.

19. The system according to claim 18, wherein calibrating the wireless MIMO device comprises:
estimating at least one of a phase mismatch or an amplitude mismatch for each antenna of one or more antennas of the antenna array based on the received plurality of calibration signals and based on the known directions from the wireless MIMO device to each proximate wireless MIMO device of the plurality of proximate wireless devices, and
adjusting transmission coefficients according to the at least one of the phase mismatch or the amplitude mismatch.

20. The system of claim 18, wherein two or more calibration iterations are performed by the wireless MIMO device, each calibration iteration comprising:
- receiving, using the array of antennas, the plurality of calibration signals from the plurality of proximate wireless MIMO devices and calibrating the wireless MIMO device based on the received plurality of calibration signals and based on known directions from the wireless MIMO device to each proximate wireless MIMO device of the proximate wireless MIMO devices, and
- driving the array of antennas to emit a beam-formed calibration signal to each proximate wireless MIMO device of the plurality of proximate wireless devices in order to enable each proximate wireless MIMO device of the plurality of proximate wireless MIMO devices to calibrate itself.

* * * * *